United States Patent [19]

Ferragni

[11] Patent Number: 4,800,837
[45] Date of Patent: Jan. 31, 1989

[54] MACHINE FOR DEPOSITING PRODUCT ON A PLANE AND HORIZONTAL SURFACE, ESPECIALLY MACHINE FOR DEPOSITING FRIT ON CATHODE TUBE CONES

[75] Inventor: Clemente Ferragni, Frosinone, Italy

[73] Assignee: Videocolor, Montrouge, France

[21] Appl. No.: 60,163

[22] Filed: Jun. 10, 1987

[30] Foreign Application Priority Data

Jun. 13, 1986 [FR] France .................. 86 08586

[51] Int. Cl.4 ............................................. B05C 3/20
[52] U.S. Cl. ................................. 118/410; 118/323; 118/500; 118/698
[58] Field of Search ............... 118/697, 698, 321, 323, 118/409, 500

[56] References Cited

U.S. PATENT DOCUMENTS

| | | | |
|---|---|---|---|
| 2,792,810 | 5/1957 | Maconeghy et al. | 118/500 X |
| 3,339,522 | 9/1967 | Shaffer et al. | 118/321 X |
| 3,342,158 | 9/1967 | Bennett et al. | 118/321 X |
| 3,492,146 | 1/1970 | Korwaker | 118/409 X |
| 3,575,131 | 4/1971 | Lohmann | 118/321 X |
| 4,048,951 | 9/1977 | Tamura | 118/697 X |
| 4,056,075 | 11/1977 | Seiderman | 118/321 X |
| 4,137,341 | 1/1979 | Adachi | 118/411 X |
| 4,194,463 | 3/1980 | Kimbrough et al. | 118/321 X |
| 4,262,036 | 4/1981 | Mineyama et al. | 118/323 X |
| 4,508,051 | 4/1985 | Bast | 118/323 X |
| 4,564,410 | 1/1986 | Clitheros et al. | 118/697 X |
| 4,576,113 | 3/1986 | Kambara et al. | 118/323 X |
| 4,592,303 | 6/1986 | Wilbur, Jr. | 118/409 |
| 4,604,967 | 8/1986 | Wilbur, Jr. et al. | 118/409 X |
| 4,605,569 | 8/1986 | Shimada et al. | 118/697 X |

Primary Examiner—Shrive Beck
Assistant Examiner—Alain Bashore
Attorney, Agent, or Firm—Oblon, Fisher, Spivak, McClelland & Maier

[57] ABSTRACT

To make a deposit of frit on a cone, the invention proposes to keep the cone fixed during the application with only the applicator moving. To ensure the evenness of the deposit, the cone is centered with respect to a reference axis, and it is brought to a stop against a reference horizontal plane. When the cone is centered, its standard dimension is automatically determined, and the computer that controls the movements of the applicator makes it follow a corresponding standard path.

5 Claims, 4 Drawing Sheets

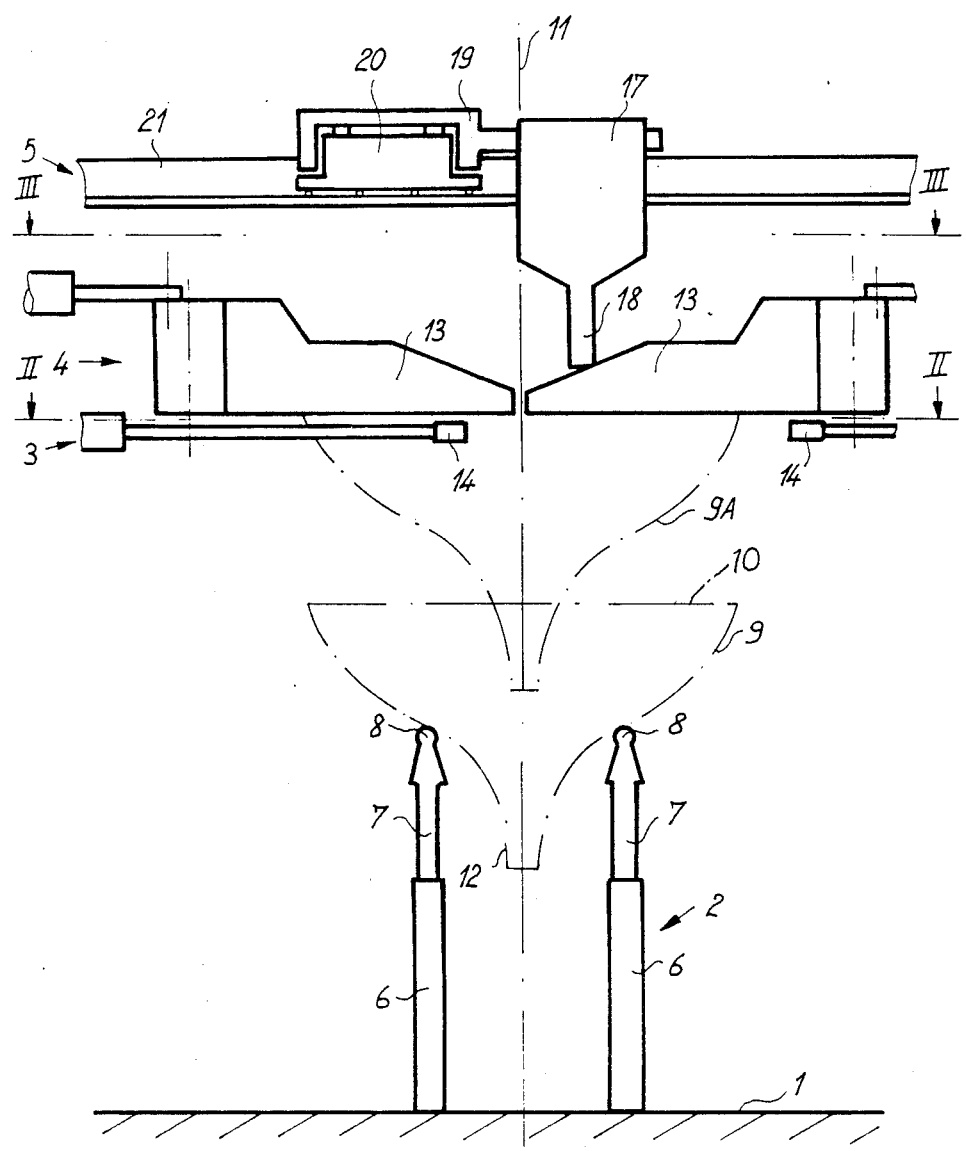
FIG_1

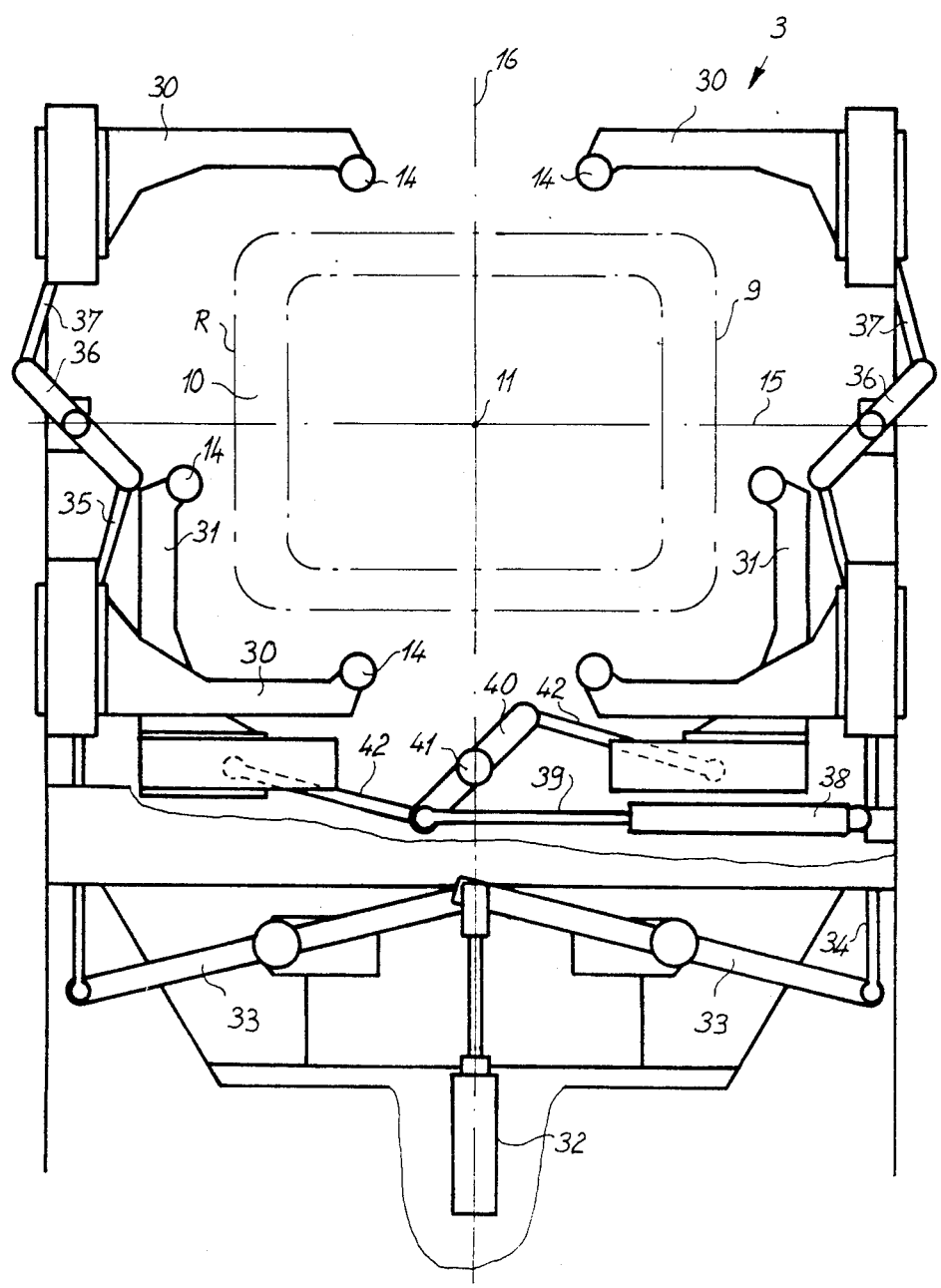
FIG_2

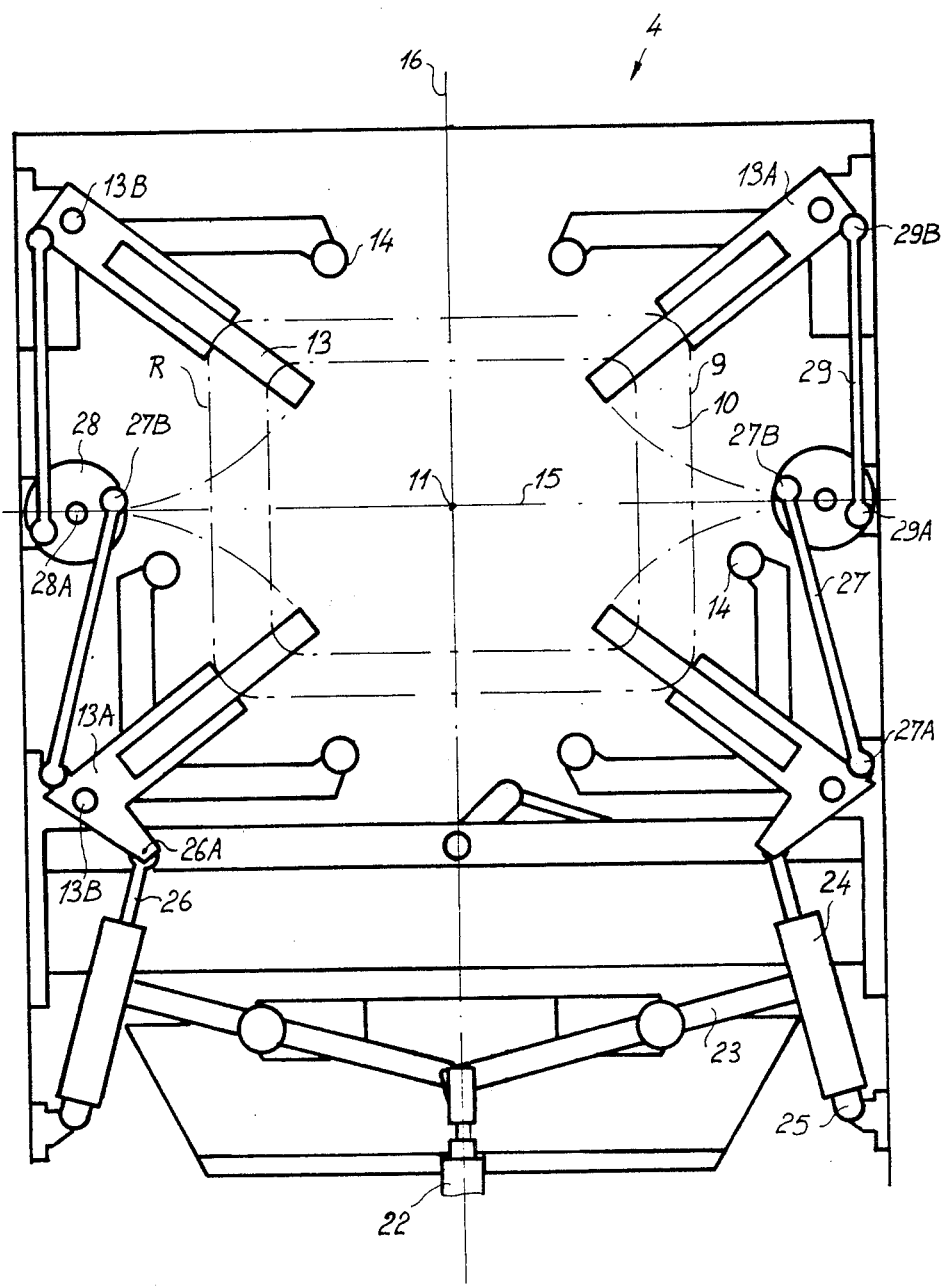
FIG_3

FIG_4
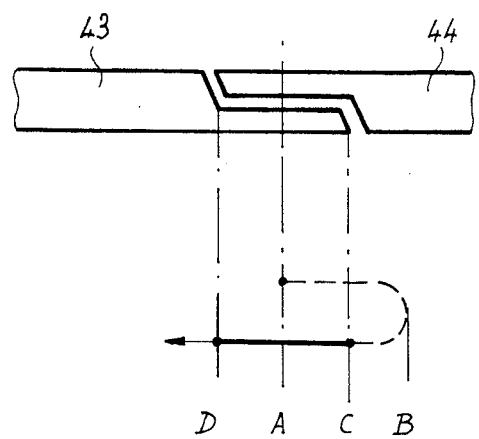
FIG_5
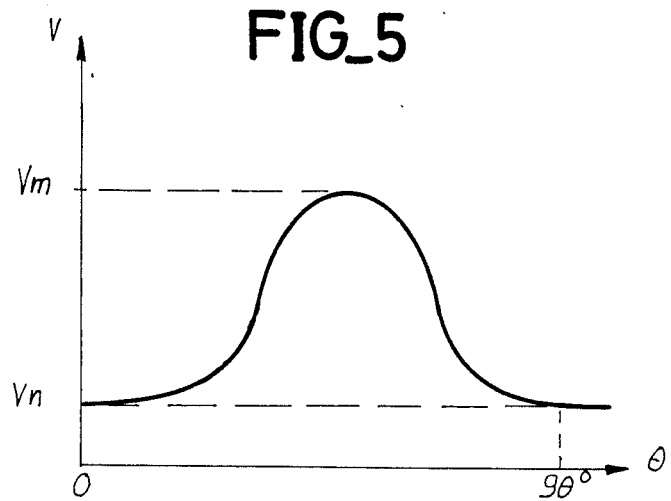

MACHINE FOR DEPOSITING PRODUCT ON A PLANE AND HORIZONTAL SURFACE, ESPECIALLY MACHINE FOR DEPOSITING FRIT ON CATHODE TUBE CONES

BACKGROUND OF THE INVENTION

1. Field of the Invention

The present invention pertains to a machine for depositing a product on a plane and horizontal surface, especially a machine for depositing sintered glass, known as "frit", on cathode tube cones.

2. Description of the Prior Art

Frit-depositing machines in current use comprise a rotating cone support that works with a frit applicator comprising essentially a container that ends in a nozzle at its lower part. This applicator is joined to a guiding castor which moves along the slightly conical internal periphery of the upper (flared) part of the cone. The bead of frit deposited on the flat edge of the cone (i.e., its upper front surface intended for bonding to the slab) by these machines of the prior art is uneven for the following reasons. The rotating support of the cone does not allow the cone to be positioned in such a way that its flat edge is always strictly horizontal. This means that, if horizontality is not obtained, the distance between the applicator nozzle and this flat edge can vary. Hence, the angle of incidence between the flow of frit leaving the nozzle and this flat edge is variable, and this causes corresponding variations in the thickness an/or width of the bead deposited on the flat edge. Additionally, the guiding castor follows a path with a variable distance from the surface of the flat edge, and this means that the axis of the deposited bead does not quite accurately follow the longitudinal axis of the flat edge surface. Furthermore, even if the cone is well set on its rotating support but the internal peripheral surface of the upper part of the cone is uneven or has flaws on the path of the castor, the castor itself reflects them on to the path of the deposited bead. Finally, it is difficult to adapt one and the same machine to differing sizes of cathode tubes.

OBJECT OF THE INVENTION

The object of the present invention is a machine which can be used to deposit a frit bead with the greatest possible speed on the flat edge of a cathode tube cone, a bead with a section that is as even as possible and that will follow the longitudinal axis of the cone's flat edge as evenly as possible, where it is possible to adapt one and the same machine to cathode tubes of different sizes.

SUMMARY OF THE INVENTION

The machine according to the invention comprises, firstly, a cone-raising device that supports the cones as near as possible to their neck, this cone-raising device working together with a set of movable stops and a cone-centering device, and, secondly, a frit applicator with a control device which makes the frit applicator follow a standard path depending on the standardized dimensions of the cone's flat edge, the cone being fixed during application.

According to an advantageous characteristic of the invention, the cone-centering device works with a measuring device which determines the dimensions of the cone and indicates the standard path chosen to the control device.

According to another characteristic of the invention, the moving speed of the applicator device with respect to the cone is constant in rectilinear motion and variable when moving along a curve.

BRIEF DESCRIPTION OF THE DRAWINGS

The present invention will be better understood from the following detailed description of an embodiment, taken as a non-exhaustive example and illustrated by the appended drawings, of which:

FIG. 1 is a partial side view of an embodiment of the machine according to the invention;

FIGS. 2 and 3 are partial views of the machine of FIG. 1 from the top;

FIG. 4 is a schematic section view of the frit-depositing operation performed by the machine of FIG. 1 in the initial and final depositing zones; and FIG. 5 is a graph showing the speed at which the frit applicator device of the machine of FIG. 1 moves, depending on its angular position above a corner of the cone.

DESCRIPTION OF THE PREFERRED EMBODIMENT

The machine described below is used to deposit a bead of frit on the flat edge of a cathode tube cone, but it is understood that it can be used to deposit other materials on various surfaces, following a specified line, it being possible for the cross-section of the deposited bead to be constant or to vary according to a specified principle.

The machine of the invention comprises a frame 1 supporting a cone-raising device 2 (FIG. 1), a cone-centering device 3 (FIGS. 1, 2 and 3), a set of movable stops 4 (FIGS. 1 and 3), and a frit applicator device 5 (FIG. 1).

The cone-raising device 2 comprises several (for example, four) jacks 6 which are fixed vertically to the frame 1, their outgoing rods 7 being pointed upwards. Supporting devices 8 are fixed to the end of the rods 7. The supporting devices are designed to support a cathode tube cone 9 so that its flat edge 10 (namely its front surface which is to be bonded to the corresponding surface of a slab) faces upwards and is horizontal. Since the cone 9 is laid on the supporting devices 8, for example, by handling means, without any very precise orientation, the shape and arrangement of the supporting devices 8 should make it possible to center the cone 9 easily on a vertical reference axis 11, around which the jacks 6 are evenly arranged. Of course the cone 9 is laid on the supporting device 8, the rods 7 of the jacks 6 being in a low position, in such a way that its axis is as close as possible to the axis 11, so that the subsequent centering stage can be conducted as easily as possible. To facilitate this centering process, the supporting devices 8 come into contact with the cone 9 as close as possible to its neck 12 without, however, being too close to it, in order to prevent the cone from falling, and this should be the case for all expected sizes of cones. According to an alternative embodiment which is not shown, the jacks 6 may be close to or at a distance from one another, depending on the dimensions of the cones 9. Furthermore, the supporting device 8 are made so that the cone 9 can slide slightly when it is centered with reference to the axis 11. According to the embodiment shown in FIG. 1, the supporting devices 8 are balls.

The cone-raising device 2 works with the set of movable stops 4 located on top of it. When the cone 9 is positioned on the supporting devices 8, and when frit is deposited, the stop rods 13 retreat by pivoting. However, it is also possible, in an alternative embodiment which is not shown, to provide for non-pivoting retractable stops which may be telescopic or simply move along their own axes.

The rectangular-sectioned stop rods 13, of which there are four, for example, move horizontally, and their lower surfaces are coplanar, the horizontal plane that they form being the reference plane for the flat edge 10. When the cone 9 is placed on the supporting devices 8, the jacks 6 are actuated automatically and, through the rods 7, the jacks 6 lift the cone 9 until it comes to a stop against the stop rods 13. Owing to the fact that the supporting devices 8 enable the cone 9 to slide slightly, if the flat edge 10 of the cone 9 is not perfectly horizontal when the cone 9 is positioned on the supporting device 8, the flat edge 10 becomes upright, coming to a stop against the stop rods 13 (position 9A on FIG. 1). Of course, the jacks 6 are actuated in such a way that the front surface of the cone 9 comes lightly to a stop against the stop rods 13, and their pressure is maintained for as long as the cone 9 is not perfectly centered with respect to the axis 11. The stage in which the cone 9 is centered can take place simultaneously with its being stopped against the stop rods 13 or just afterwards.

The centering is done by means of several (for example, six) identical centering castors 14 applied to the outside surface of the cone 9, a little below the plane of its flat edge 10. The axes of these castors are vertical, they all move horizontally, and their upper surfaces are coplanar. If we consider the rectangle R with rounded corners, determined by the intersection of the plane of the surfaces (the upper surfaces for example) of the centering castors 14 and the cone 9, and if six centering castors 14 are used, there are two centering castors 14 facing each long side of the rectangle R and only one centering castor 14 facing each short side. In the embodiment shown in the drawings, the centering castors 14 do not move vertically. However, in an embodiment which is not shown, the centering castors also move vertically, while still remaining coplanar, in synchronism with the rods 7 of the jacks 6, so as to center the cone 9 as soon as it is placed on the supporting devices 8 and so as to rise with it until it comes to a stop against the stop rods 13.

Of course, in order to center the tube properly with respect to the vertical axis 11, the centering castors 14 corresponding to the long and short sides of the rectangle R move symmetrically with respect to two vertical planes passing through the vertical axis 11 and are respectively perpendicular to the short and the long sides. FIGS. 2 and 3 show the respective outlines 15 and 16 of these planes in dot and dash lines.

According to an advantageous characteristic of the invention, the centering castors 14 are joined to a simple measuring device, the making of which is obvious to the specialist. The measuring device determines the standard dimensions (corresponding to the diagonal of the finished tube) of the cone 9 which is on the supporting devices 8. Since the differences between successive standard dimensions are relatively great, this measuring device does not need to be very precise, and it therefore has a low cost price.

The applicator device 5, of which a simple and partial view is given in FIG. 1, comprises essentially of frit container 17, which ends at its lower part in a nozzle 18 which can be closed. The container 17 is maintained by a movable trolley 19 in such a way that the end of the nozzle 18 is at a small and constant distance from the plane of the flat edge 10 of the cone 9 when the cone 9 is in the top position 9A. The trolley 19 moves along a first rail 20 which itself moves on two other rails 21 (only one of the rails 21 can be seen in FIG. 1) parallel to each other and perpendicular to the first rail 20. These three rails are located above the stopping plane of the stop rods 13, and they are arranged in such a way and their dimensions are such that the nozzle 18 can cover the flat edge 10 of the biggest cone that can be envisaged.

The movements of the trolley 19 with respect to the first rail 20 and those of the first rail 20 with respect to the rails 21 are produced by any appropriate device (for example, by motors that drive cables by means of pulleys, by linear motors with rails forming the inductive part, etc.) These devices are controlled by a computer in a manner which is known per se. The computer can also cause the nozzle 18 to make any movement desired. Of course, the first rail 20 and the rails 21 and their motors can be replaced by any device performing the same function (the programmable driving of the applicator nozzle 18).

FIG. 3 shows an embodiment of a device to control the stop rods 13. The stop rods 13 are mouned on supports 13A that pivot on fixed points 13B arranged symmetrically on the extensions of the diagonals of the rectangle R. In the rest of the description, the lines 15, 16 will be considered to be equivalent to axes of symmetry. This control device comprises a main jack 22, arranged along the axis 16, controlling by means of two links 23, which pivot somewhat in their surroundings, the bodies of two secondary jacks. The closed ends of the secondary jacks 24 pivot at fixed points 25 symmetrical with the axis 16. Each of the rods 26 of the two secondary jacks 24 is hinged at 26A on the support 13A which is closest to it. Two links 27, pivoting at 27A (the points 26A, 13B and 27A are substantially aligned for each of the two supports 13A) on these two supports 13A, pivot at their other end on points 27B on rotating disks 28, the centers 28A of which are located on the axis 15 symmetrically with respect to the axis 16. Two other connecting rods 29, pivoting at 29A on the disks 28 (the points 27B and 29A are diametrically opposite to each other on each disk 28) pivot at their other end on points 29B on the two other supports 13A, near their rotational axes 13B. Thus, when the main jack 22 is in the state shown in FIG. 3 (with its rod withdrawn), the secondary jacks 24 form an acute angle with each other, their rods 26 being withdrawn. The four stop rods 13 converge on the axis 11. When the main jack 22 is actuated, its piston, through the links 23, moves the secondary jacks 24 away from the axis 16 until they become substantially parallel to each other and, simultaneously, their pistons are actuated to make the rods 26 come out. The movement of the rods 26 makes the two corresponding supports 13A rotate in the direction of the disks 28. The rotations of the two supports 13A cause rotations in opposite directions of the respective disks 28 under the effect of the links 27. Through the connecting rods 29, the rotations of the disks 28 cause rotations in the same directions of the other two corresponding supports 13A, which also approach the disks 28. At the end of the movement of the piston of the main jack 22, the four stop rods 13 are parallel to each other and to the axis 16. This makes it possible to remove the cone 9 from the top and insert another one in its place.

The cone-centering device 3 shown in the FIGS. 2 and 3 comprises movable supports 30 for the four centering castors 14 located so that they face the long sides of the cone 9 and are movable towards the axis 15 parallel to the axis 16. The cone-centering device 3 also comprises two movable supports 31 for the other two centering castors 14. The movable supports 31 move towards the axis 16 parallel to the axis 15. The movements of the four supports 30 are controlled by a first jack 32 arranged along the axis 16. Through two links 33, pivoting in their surroundings, the first jack 32 actuates two other links 34 that pivot at both their ends. Each of the links 34 is connected to a support 30, these two first supports 30 being the closest to the first jack 32. Each of these two supports 30 is connected to another support 30 which is on the same side as itself with respect to the axis 16 through the following in succession: a link 35, pivoting on its ends, then a link 36 pivoting at its center located on the axis 15 and at its ends, and then a link 37 pivoting on its ends. Thus, through the hinging of the links 35, 36, and 37, symmetrically with the axis 15, the supports 30 symmetrically approach the axis 15 when the rod of the first jack 32 emerges from its cylinder, and this makes it possible to center the cone 9 with respect to the axis 15.

The cone-centering device 3 further comprises a second jack 38, the axis of which is parallel to the axis 15. The rod 39 of the second jack 38 forms a hinge with a link 40 pivoting in its surroundings at a point 41 located on the axis 16. The ends of the link 40 are each connected by a link 42 to a support 31. The hinge formed by the links 40 and 42 is symmetrical with the axis 16. Thus, the second jack 38 controls the movements of the supports 31 symmetrically with respect to the axis 16, making it possible to center the cone 9 with reference to the axis 16. Thus, the actions of the jacks 32 and 38 make it possible to center the cone 9 with respect to the axis 11 passing through the intersection of the axes 15 and 16 and perpendicular to them. When a cone 9 has been centered by the cone-centering device 3, the movable stops 4 are withdrawn and make the space free for the frit applicator device 5.

Of course the stops 4 and the cone-centering device 3 can be replaced by equivalent devices performing the same functions.

The cone-centering device 3 and the movable stops 4 may be advantageously controlled by the computer that controls the movements of the frit applicator device 5. Unlike what happens in the devices of the prior art, the frit applicator device 5 has no mechanical contact with the cone 9: the cone-centering device 3 determines the standard dimensions of the cone 9 present, and the applicator-controlling computer makes the nozzle 18 of the applicator follow a standard path according to the standard dimension of the cone 9 present, this path preferably following the longitudinal axis of the flat edge 10. A device of this type can be used to treat cones which have differing standard dimensions. Furthermore, since the cone 9 is fixed during the depositing operation, and since only the frit applicator device 5 is moved, the bead of frit can be deposited far more quickly than with machines of the prior art where the cone rotates on its vertical axis.

Since the plane of the flat edge 10 of the cone 9 remains horizontal, and since the cone 9 is fixed, the distance between the outlet of the nozzle 18 and this surface 10 is constant during application. Thus the angle of incidence of the applied product with the flat edge 10 can be set at a constant optimum value.

According to another characteristic of the invention, the rate at which the product flows through the nozzle 18 is kept constant. To deposit a bead with a constant section, the applicator must move at a constant speed Vn along rectilinear parts but if this speed is maintained along portions of paths with a low radius of curvature (the rounded corners of the surface 10 of the cone), the section of the deposited bead increases greatly in these portions. To maintain a constant section of the bead in these portions, the moving speed of the applicator is increased, as shown in FIG. 5: taking the start of the rotation of the frit applicator device 5 as the origin of the abscissa (0°) on the graph, the speed is gradually increased from the initial value Vn to a maximum value Vm for a rotation of 45°, and it is made to decrease symmetrically down to the initial value Vn, which is reached for a rotation of 90°, the shape of the curve thus obtained being approximately Gaussian.

At the start of the depositing operation, which is preferably located in the middle of a long side of the flat edge 10, the moving speed of the frit applicator device 5 increases from a value of zero to the rated speed Vn (constant speed on a rectilinear path). If the nozzle 18 is open at the start of the movement of the applicator, the beginning of the bead has a greater section than the one obtained at the speed Vn, this section varying inversely with the variation in speed. To avoid this, the nozzle may be opened when it is estimated that the speed Vn is reached. However, an estimate of this kind is not very precise and may vary, for example, with the quantity of product remaining in the container 17. Furthermore, the reverse phenomenon takes place when the applicator returns to its starting point at the end of the bead-depositing operation.

To avoid these disadvantages, the present invention proposes to move the frit applicator device 5 as follows: (see FIG. 4) from the resting point A (preferably located in the middle of the long side of the surface), the frit applicator device 5 is made to move in the reverse direction of normal movement, with the nozzle 18 closed, up to a point B at a distance of 2 to 3 cm. for example from the point A, then the movement of the frit applicator device 5 is reversed, and its speed is increased until it reaches the value 2Vn, this value having to be reached before the frit applicator device 5 passes through a point C, located between A and B, at about 1 cm. from A. At the point C, the nozzle 18 is opened. The speed is maintained at the value of 2Vn up to a point D, symmetrical with C in relation to A. From D onwards, the speed goes back to the value Vn. At the end of the bead-depositing operation, when the frit applicator device 5 returns to the point C, the speed is made to return to the value 2Vn, and does so up to the point D, where the nozzle 18 is closed, and the movement of the frit applicator device 5 is stopped. Thus, as shown schematically in FIG. 4, the beginning of the bead 43 between C and D has a section equal to half the value that must be obtained, and the same is true of the end 44 of this bead between these same points C and D. Consequently, between these two points, both upstream and downstream, a bead with a substantially constant section is obtained, more surely than if the operation were to be started from A, opening the nozzle immediately or even shortly after the start and laying down the speed Vn.

According to one embodiment of the invention, the flowrate of the nozzle can be regulated at a constant speed of movement, but a method of this type is more complicated in its application.

What is claimed is:

1. A machine for depositing a product on a planar, horizontal surface of an object in a closed path having straight sections and at least one rounded corner, said machine comprising:
    (a) first means for holding an object having a planar surface in a work position in which the planar surface is horizontal;
    (b) a single nozzle capable of depositing a product at a fixed rate, said single nozzle being disposed above the planar surface of the object when the object is in its work position; and
    (c) second means for moving said single nozzle relative to the planar surface of the object in a closed path having straight sections and at least one rounded corner, said second means being adapted:
        (i) to move said single nozzle at a constant speed $V_n$ while said nozzle is moving along the straight sections of the closed path, to increase the speed of said single nozzle beginning at the beginning of said at least one rounded corner to a maximum speed of $V_m$ half way through said at least one rounded corner, and to decrease the speed of said single nozzle back to $V_n$ at the end of said at least one rounded corner, the increase and decrease in speed being accomplished in a symmetrical and at least approximately Gaussian manner, and
        (ii) at the start of a circuit around the closed path, to move said single nozzle over a short distance at the speed $2V_n$, thereby obtaining half of the normal deposition of the product over that short distance, and, at the end of the circuit around the closed path, to move said single nozzle over the same short distance at the speed $2V_n$, thereby again obtaining half of the normal deposition of the product over that short distance.

2. A machine as recited in claim 1 wherein:
    (a) the product is frit and
    (b) the objects are cathode tube cones.

3. A machine as recited in claim 1 and further comprising:
    (a) third means for receiving and loosely grasping the object beneath the work position of the object;
    (b) fourth means for lifting the object to a ready position in which its planar surface is at least approximately in its work position; and
    (c) fifth means for adjusting the orientation of the object in its ready position so that the planar surface of the object becomes horizontal and precisely aligned relative to said single nozzle.

4. A machine as recited in claim 1 wherein:
    (a) the object has an axis and
    (b) said machine further comprises seventh means for centering the axis of the object on a vertical reference axis.

5. A machine as recited in claim 1 and further comprising:
    (a) a measuring device that determines which of a predetermined number of possible sizes the object has and
    (b) eighth means for adjusting the dimensions of the closed path as a function of the size of the object determined by said measuring device.

* * * * *